UNITED STATES PATENT OFFICE.

ROBERT N. RUYLE, OF ROODHOUSE, ILLINOIS, ASSIGNOR OF ONE-FOURTH TO HARRY C. DECK AND ONE-FOURTH TO ALBERT J. FELL, OF ROODHOUSE, ILLINOIS.

WELDING COMPOUND.

999,403.     Specification of Letters Patent.     Patented Aug. 1, 1911.

No Drawing.     Application filed May 19, 1910. Serial No. 562,312.

*To all whom it may concern:*

Be it known that I, ROBERT N. RUYLE, a citizen of the United States, residing at Roodhouse, in the county of Greene and State of Illinois, have invented certain new and useful Improvements in Welding Compounds; and I do declare the following to be a full, clear, and exact description of the invention, such as will enable others skilled in the art to which it appertains to make and use the same.

This invention relates to a new and useful composition of matter to be used in connection with the welding of steel, copper, cast iron and other metals, of which the following is a specification.

My composition consists of the following ingredients, combined in the proportions stated, viz:—

| | |
|---|---|
| Powdered clay | 3 parts. |
| Salt | ¾ part. |
| Carbonate of iron | ⅛ part. |
| Sal-ammoniac | ⅛ part. |

The proportions above given were measured by volume. These ingredients are to be thoroughly mingled by agitation.

In using the above named composition for welding purposes, the metal is first heated to a welding heat or nearly so, then removed from the fire and inserted in the compound. This operation may be repeated if necessary. The adhesion of the compound to the metal will permit the latter to be heated several degrees hotter than it could otherwise be heated, without burning or melting, thereby greatly facilitating the welding of the metal when hammered together and being especially applicable to the welding of copper or of welding copper to steel.

The carbonate of iron is added to cause the compound to adhere closely to the metal and prevent its being blown off by the draft from the blower.

Having thus described my invention what I claim is:

1. The herein described composition of matter, consisting of clay, salt, carbonate of iron, and sal-ammoniac, substantially as and for the purpose specified.

2. The herein described composition of matter, consisting of clay, three parts; salt, three-fourths part; carbonate of iron, one-eighth part, and sal-ammoniac, one-eighth part, substantially as described.

In testimony whereof I have hereunto set my hand in presence of two subscribing witnesses.

ROBERT N. RUYLE.

Witnesses:
   HAROLD A. McIVER,
   FRED S. STUART.